United States Patent [19]
Boothe

[11] Patent Number: 5,158,444
[45] Date of Patent: Oct. 27, 1992

[54] UNITARY RINSE NOZZLE

[75] Inventor: Steven D. Boothe, West Valley, Utah

[73] Assignee: Edo Corporation, Fiber Science Division, Salt Lake City, Utah

[21] Appl. No.: 699,697

[22] Filed: May 14, 1991

[51] Int. Cl.⁵ ............................. B08B 3/02; B08B 9/08
[52] U.S. Cl. .................................... 134/166 R; 4/321; 29/890.142; 239/DIG. 19
[58] Field of Search ............... 134/166 R, 169 R, 113; 239/DIG. 19; 29/890.142, 890.143; 4/321, 322, 323

[56] References Cited

U.S. PATENT DOCUMENTS

| | | | |
|---|---|---|---|
| 1,831,586 | 11/1931 | Barr | 239/DIG. 19 |
| 3,743,187 | 7/1973 | Breunsbach | 239/DIG. 19 |
| 4,107,798 | 8/1978 | Lamb et al. | 4/321 |
| 4,170,048 | 10/1979 | Anthony | 4/321 |
| 4,905,325 | 3/1990 | Colditz | 134/166 R X |

Primary Examiner—Philip R. Coe
Attorney, Agent, or Firm—Thorpe, North & Western

[57] ABSTRACT

An improved rinse nozzle apparatus is described which is mounted on an aircraft waste tank and functions to efficiently rinse the interior of the waste tank when the tank is emptied and cleaned. The rinse nozzle includes a plastic body mounted on the tank. A stainless steel hose connect nipple is molded into the body at a first end of a liquid passageway which is provided therethrough. A plurality of brass rinse jets are also molded into the body. The rinse jets disperse and direct the cleaning solution against the inside of the waste tank. By fabricating the rinse nozzle mostly from light-weight plastic and molding the metal hose connection nipple and rinse jets into the plastic body, a lighter weight, leak free, and less expensive rinse nozzle is provided.

14 Claims, 4 Drawing Sheets

UNITARY RINSE NOZZLE

BACKGROUND

1. The Field of the Invention

This invention relates to a devices used to clean the inside of aircraft waste tanks and the like.

2. The Background Art

Large tanks are mounted on passenger aircraft for receiving and holding human waste products during passenger flights. At the end of each flight, the tanks are drained of the waste products and, to the extent possible, the interior of the tanks are rinsed or washed to remove any wastes which may be clinging or sticking to the inside walls of the tanks. This is done by spraying water or a cleaning solution through nozzles mounted inside the tank against the inside walls of the tanks. The previously available nozzles have several problems and drawbacks.

The previously available nozzles were fabricated of two or more pieces which would be screwed together and leaks would often undesirably develop at the joints between the pieces, such as between the body and the rinse jets. When a leak develops, less cleaning solution is directed against the wall of the tank thus reducing the effectiveness of the cleaning process. Another problem which is encountered is that the parts had to be assembled together thus increasing the cost of the nozzle. Still further, it is desirable to reduce the weight of all components included in an aircraft, including rinse nozzles, as much as possible. The over-use of metals in previously available rinse nozzles increased their weight more than is necessary.

Significantly, the rinse jets provided on previously available nozzles protruded from the body of the nozzle. This caused waste held in the tank to attach to the jets, cling to the nozzle, sometimes clog the jets, and make a complete cleaning of the tank more difficult. Moreover, waste held in the tank is likely to cling to parts of the nozzle which are fabricated from a metal, for example, stainless steel. When the jets become clogged, the flow of cleaning solution therethrough is stopped. Of course, this results in even less uniform cleaning of the tank so that some waste products remain in the tank. In turn, with the next use of the tanks, additional waste products cling to the old unremoved products so that a buildup of waste products occurs in the tank. The only solution to this problem then is to remove the waste tank for special cleaning which, of course, is very time-consuming and costly.

In view of the forgoing, it would be an advance in the art to provide an improved rinse nozzle structure and method of manufacture thereof which overcomes the problems and drawbacks previously noted.

BRIEF SUMMARY AND OBJECTS OF THE INVENTION

In view of the above described state of the art, the present invention seeks to realize the following objects and advantages.

It is an object of the invention to provide a simple, easy-to-maintain spray nozzle for use in aircraft waste tanks.

It is also an object of the invention to provide a spray nozzle for use in aircraft waste tanks which is durable and resistant to leaks.

It is a further object of the invention to provide a lightweight spray nozzle for use in aircraft waste tanks.

It is an additional object of the invention to provide a spray nozzle for use in cleaning aircraft waste tanks which is capable of remaining substantially clog-free and which is resistent to waste becoming clinging thereto.

It is another object of the present invention to provide method of manufacturing a spray nozzle for use in aircraft waste tanks which is efficient and readily implemented.

It is a still further object of the present invention to provide a spray nozzle for use in aircraft waste tanks which is fabricated with few or no protrusions to which waste can cling.

These and other objects and advantages of the invention will become more fully apparent from the description and claims which follow, or may be learned by the practice of the invention.

The present invention is an improved rinse nozzle apparatus which is mounted in an aircraft waste tank and functions to efficiently rinse the interior of the waste tank when the tank is emptied. The rinse nozzle includes a body which is preferably comprised of a polymeric material to reduce the weight of the nozzle and to reduce the clinging of waste thereto.

A liquid passageway is provided through the rinse nozzle body. A hose connect nipple is preferably molded into the body at a first end of the liquid passageway. By molding the hose connect nipple into the body, a more secure, leak-free connection is provided at a lower cost and weight. The hose connect nipple allows the rinse nozzle to be connected to a hose carrying a cleaning solution under pressure. The hose connect nipple is comprised of a material which is different than the material from which the body is fabricated. It is preferred that the body be comprised of a polymeric material such as nylon and the hose connect nipple be comprised of a metal such as stainless steel.

A plurality of rinse jets are attached to the body and are placed in communication with the passageway. The rinse jets disperse and direct the cleaning solution against the inside of the waste tank. The rinse jets are comprised of a material, preferably a metal such as brass, which is different from the polymeric material from which the body is fabricated. The rinse jets are preferably molded into the body as is the hose connect nipple. The rinse jets can be oriented so that the streams of cleaning solution are directed against the interior of the waste tank, for example, against level detection sensors mounted on the tank, and such that any waste clinging inside the waste tank can be dislodged.

BRIEF DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

As indicated earlier, waste tanks in aircraft must be regularly drained and cleaned. Since it would be impractical and costly to remove and disassemble a waste tank each time it need to be cleaned, cleaning solution is sprayed on the inside of the tank thorough permanently mounted rinse nozzles positioned on the tank.

Previously available rinse nozzle encountered problems with leaks at points between components and waste sticking to the nozzle and sometimes impeding the flow of solution therefrom. The present invention overcomes these problems in a low cost and effective matter.

Figure 1:
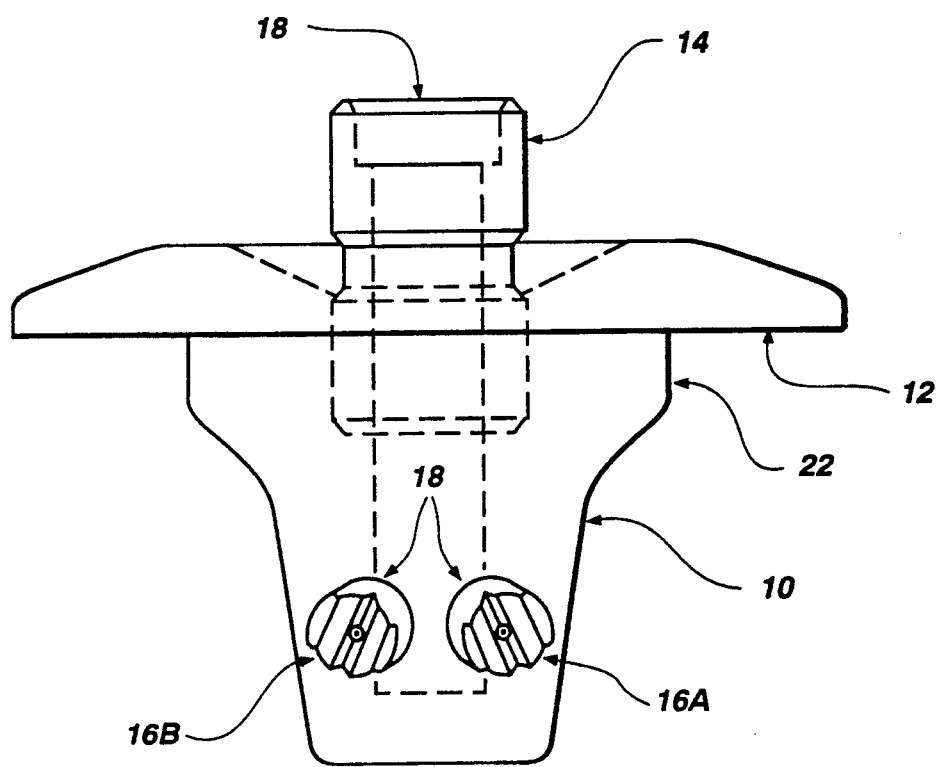
FIG. 1 is a side view of the presently preferred embodiment of the rinse nozzle of the present invention.

Represented in FIG. 1 is one presently preferred embodiment of the present invention. The illustrated embodiment includes a body 10 which is preferably fabricated from a polymeric material, preferably nylon of some kind. Significantly, the problem of waste clinging to the nozzle, and to other structures inside the tank, has been long felt in the art. Waste tends to cling less to polymeric materials, such as nylon and other plastic material, than to metallic materials.

The body 10 is preferably fabricated using injection molding techniques known to those skilled in the art. The present invention's use of injection molding to form the body from a polymeric material provides a rinse nozzle which is lighter weight (important in all aircraft components), more reliable, and easier to manufacture than previously available structures which are fabricated using techniques such as machining of metal parts.

Fabricated as part of the body 10 is flange 12. The structure of the flange 12 makes the body readily and securely mountable on a waste tank (not represented in FIG. 1). The underside of the flange 12 can be secured to the outer wall of the tank using fasteners or an adhesive. Alternatively, a hole in the waste tank and a shoulder 22 can both be provided with threads to secure the body 10 in place. Still further, a number of other structures, such as brackets of various types, can be used to secure the body 10 to the waste tank.

The shape of the body represented in FIG. 1 is preferred. Still, the body can be any number of different shapes. The illustrated tapered shape is desirable to reduce the instances of waste sticking and clinging to the body and any other shape which is adopted should provide a similar characteristic.

The body 10 is provided with a passageway 18 through which water or a cleaning solution travel. A hose connect nipple 14 is provided on the upper end of the body 10. The hose connect nipple 14 functions to connect to a hose which carries a liquid, such as a cleaning solution, under pressure to the passageway 18. The configuration of the hose connect nipple is designed to allow quick connection and disconnection to a hose.

It is preferred that the hose connect nipple 14 be fabricated of a material which is non-similar to the material from which the body is fabricated. Stainless steel is a preferred material for the hose connect nipple 14.

A significant advantage of the present invention is the lack of treads used to assemble the components illustrated in FIG. 1. Any threads which are exposed to the interior of the waste tank will provide a site where waste can tenaciously cling. In accordance with the present invention, the hose connect nipple 14 is secured in the body 10 during the molding process. This provides a secure, liquid-tight seal between the hose connect nipple 14 and the body 10 with a minimum of surfaces to which waste will tend to cling.

Referring now to both FIGS. 1 and 2, with the hose connect nipple 14 in place, a passageway 18 is completed from where the connection will be made to a hose (not represented) through the body 10 and will supply liquid to the rinse jets 16A and 16B. The rinse jets 16A and 16B efficiently disperse the liquid into the waste tank for best cleaning. The illustrated embodiment includes only two rinse jets but a greater number of rinse jets, or other type of fluid directing orifices, can be included in the embodiment of the invention. Those skilled in the art will appreciate that numerous structures are available or can be devised to function as rinse jets.

Figure 2:
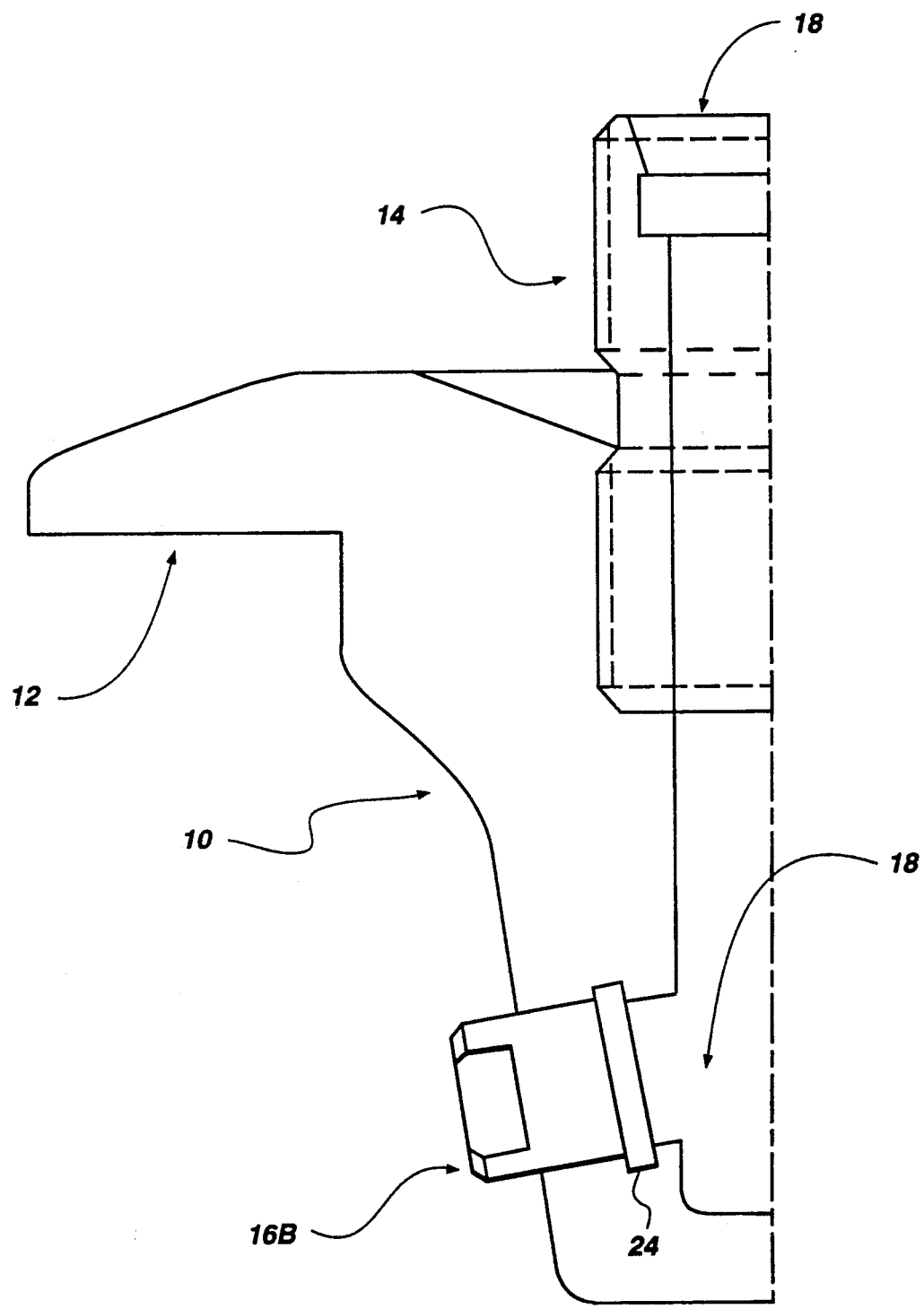
FIG. 2 is a is a partial side view of the presently preferred embodiment illustrated in FIG. 1.

As can be seen best in the partial side view of FIG. 2, the rinse jets are preferably placed in the body 10 during the molding process. A neck 24 on the rinse jet 16B secures the structure into the body 10. The rinse jet 16B can also be bonded into the bore provided in the body 10 using an adhesive or other technique known in the art. Other techniques can also be used. It is, however, preferred that the rinse jet is molded into the body.

Figure 2A:
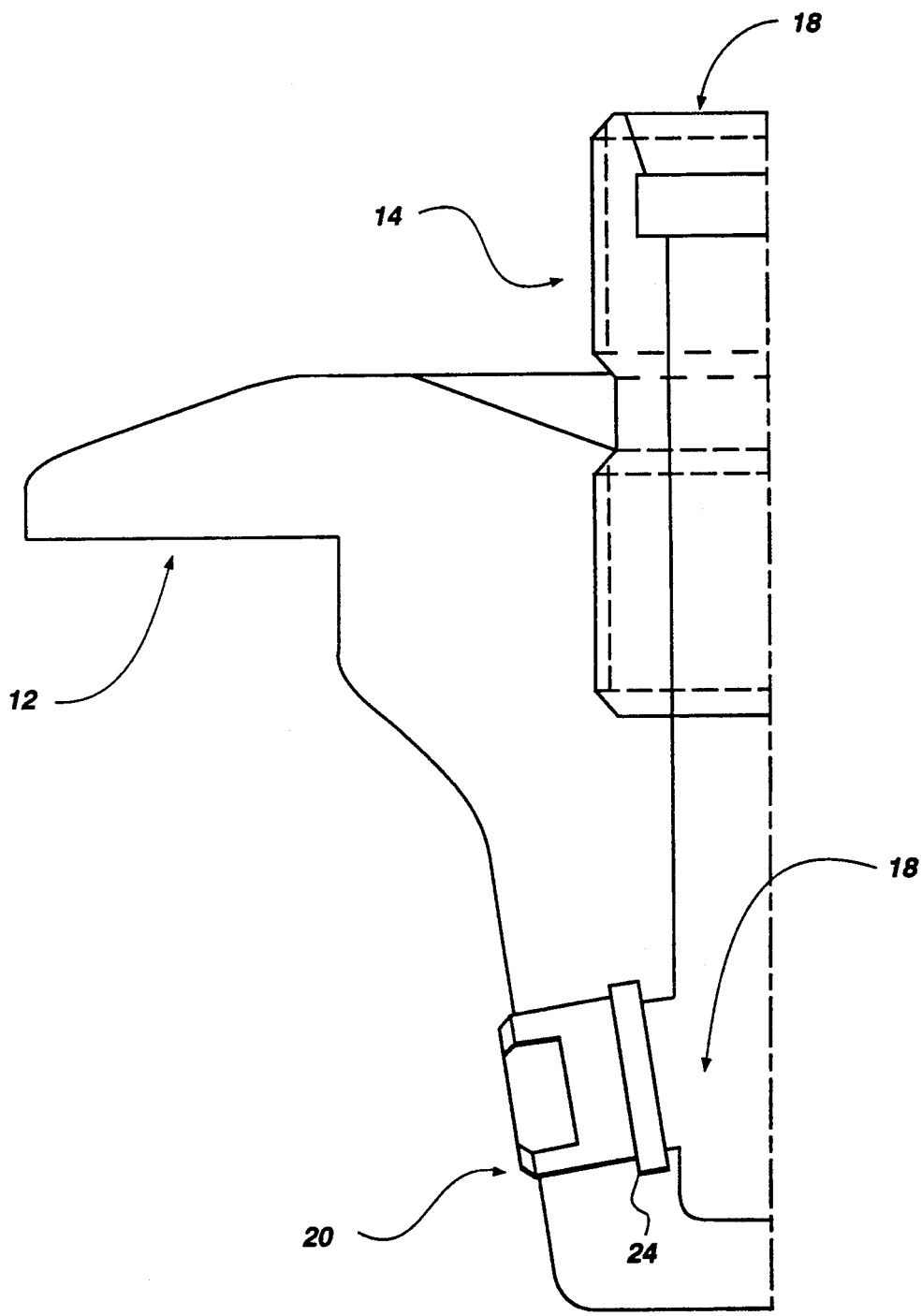
FIG. 2A is a partial side view of another preferred embodiment of the present invention wherein the rinse jets are recessed into the body of the apparatus.

Referring next to FIG. 2A, a rinse jet 20, which has been molded into the body 10, has been further recessed into the body 10. By recessing the rinse jet 20 such that it does not substantially protrude from the surface of the body, the likelihood of waste sticking to the structure is reduced.

Figure 3A:
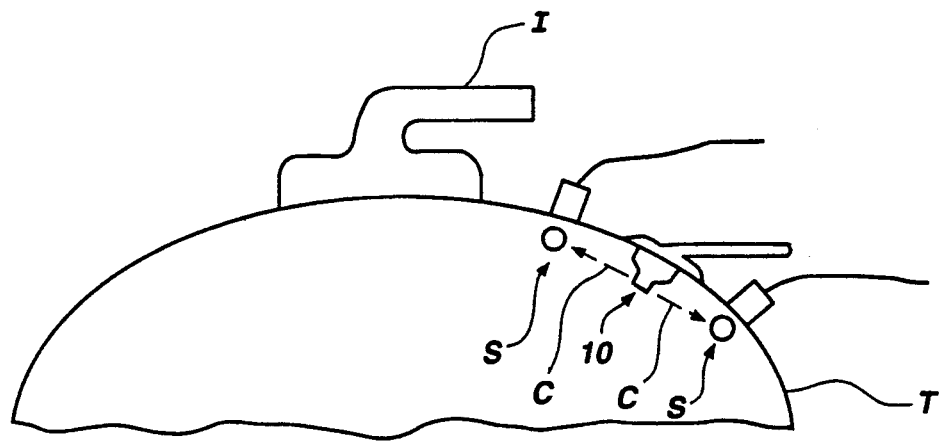
FIGS. 3A and 3B are a partial side view and a top view, respectively, of an aircraft waste tank with the presently preferred embodiment of the invention installed therein.
Figure 3B:
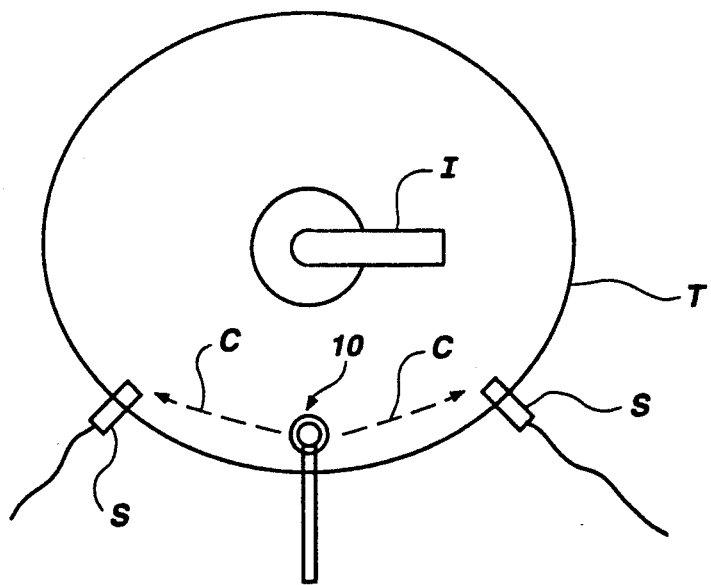

Reference will next be made to FIGS. 3A and 3B which are a partial side view and a top view, respectively, of an aircraft waste tank T with a presently preferred embodiment (10) of the invention installed thereon. Also represented in FIGS. 3A and 3B is an inlet I through which waste is deposited in the tank T. The tank T is also provided with two level detection sensors S which are mounted in the wall of the tank T. As represented in FIGS. 3A and 3B, it is desirable to oriented the stream of cleaning solution (indicated at C) at the sensors S. By directing the stream of cleaning solution at the sensors S, the sensors are kept as clean as possible to ensure proper operation of the sensors S.

In view of the foregoing, it will be appreciated that the invention provides a simple, easy-to-maintain spray nozzle for use in aircraft waste tanks which is durable and resistant to leaks. The present invention also provides a lightweight spray nozzle which is capable of remaining substantially clogfree, which is resistent to waste becoming attached thereto, and which can be fabricated with few or no protrusions to which waste can cling.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A rinse nozzle for mounting in an aircraft waste tank to communicate a liquid from the outside of the tank to the interior of the tank, said nozzle comprising:
   a body, the body being comprised of a polymeric material;
   a liquid passageway provided through the body;
   a hose connect nipple provided at a first end of the liquid passageway and molded into the body, the hose connect nipple capable of being connected to a hose carrying a liquid under pressure, the hose connect nipple comprised of a material different than the polymeric material; and
   a plurality of rinse jets attached to the body and in communication with the passageway, the rinse jets comprised of a material different than the polymeric material, such that liquid can be forced through the passageway and into the interior of the waste tank to clean waste therefrom.

2. A rinse nozzle for mounting in an aircraft waste tank as defined in claim 1 wherein the rinse jets do not substantially protrude from the surface of the body.

3. A rinse nozzle for mounting in an aircraft waste tank as defined in claim 1 wherein the rinse jets are molded into the body.

4. A rinse nozzle for mounting in an aircraft waste tank as defined in claim 1 wherein the liquid is a cleaning solution.

5. A rinse nozzle for mounting in an aircraft waste tank as defined in claim 1 wherein the hose connect nipple is fabricated from a metal.

6. A rinse nozzle for mounting in an aircraft waste tank as defined in claim 1 wherein the polymeric material comprises nylon.

7. A rinse nozzle for mounting in an aircraft waste tank as defined in claim 1 wherein the polymeric material comprises nylon and the hose connect nipple and the rinse jets each are fabricated from a metal.

8. An apparatus for holding human waste on an aircraft comprising:
   a tank capable of being mounted on an aircraft, the tank having an inlet for receiving waste liquids;
   a sensor mounted on the tank, the sensor adapted for detecting the level of the waste in the tank;
   a rinse nozzle body mounted on the tank, the rinse nozzle body being comprised of a polymeric material;
   a liquid passageway provided through the rinse nozzle body;
   a hose connect nipple provided at a first end of the liquid passageway and molded into the body, the hose connect nipple capable of being connected to a hose carrying a liquid under pressure, the hose connect nipple comprised of a material different than the polymeric material; and
   a plurality of rinse jets attached to the body and in communication with the passageway, the rinse jets comprised of a material which is different from the polymeric material, the plurality of rinse jets being oriented such that the liquid can be forced through the passageway and onto the interior of the waste tank such that waste clinging to the interior of the tank can be dislodged.

9. An apparatus for holding waste on an aircraft as defined in claim 8 wherein the rinse jets are oriented such that a stream of the liquid is directed against the sensor.

10. An apparatus for holding waste on an aircraft as defined in claim 8 wherein the rinse jets do not substantially protrude from the surface of the body.

11. An apparatus for holding waste on an aircraft as defined in claim 8 wherein the rinse jets are molded into the body.

12. An apparatus for holding waste on an aircraft as defined in claim 11 wherein the liquid is a cleaning solution.

13. An apparatus for holding waste on an aircraft as defined in claim 12 wherein the hose connect nipple is fabricated from a metal.

14. An apparatus for holding waste on an aircraft as defined in claim 13 wherein the polymeric material comprises nylon.

* * * * *